(12) United States Patent
Lu

(10) Patent No.: US 8,161,175 B2
(45) Date of Patent: Apr. 17, 2012

(54) SYSTEM AND METHOD FOR DATA TRANSMISSION

(75) Inventor: Kuei-Chih Lu, Taipei (TW)

(73) Assignee: Panasonic Corporation, Osaka (JP)

( * ) Notice: Subject to any disclaimer, the term of this patent is extended or adjusted under 35 U.S.C. 154(b) by 1106 days.

(21) Appl. No.: 11/720,643

(22) PCT Filed: Dec. 19, 2005

(86) PCT No.: PCT/JP2005/023694
§ 371 (c)(1),
(2), (4) Date: Jun. 1, 2007

(87) PCT Pub. No.: WO2006/068261
PCT Pub. Date: Jun. 29, 2006

(65) Prior Publication Data
US 2009/0172177 A1 Jul. 2, 2009

(30) Foreign Application Priority Data
Dec. 20, 2004 (CN) .......................... 2004 1 0101184

(51) Int. Cl.
*G06F 15/173* (2006.01)
(52) U.S. Cl. ..................... 709/230; 709/232; 709/236
(58) Field of Classification Search .................. None
See application file for complete search history.

(56) References Cited

U.S. PATENT DOCUMENTS

| | | | |
|---|---|---|---|
| 6,543,005 B1 | 4/2003 | Bamford | |
| 6,564,218 B1 * | 5/2003 | Roth | 1/1 |
| 6,728,713 B1 * | 4/2004 | Beach et al. | 1/1 |
| 6,968,568 B1 * | 11/2005 | Hilpert et al. | 725/90 |
| 7,305,421 B2 * | 12/2007 | Cha et al. | 1/1 |
| 7,577,804 B2 * | 8/2009 | Vageline et al. | 711/159 |
| 7,616,663 B1 * | 11/2009 | Elliott | 370/474 |
| 2002/0021885 A1 * | 2/2002 | Hasegawa et al. | 386/46 |
| 2003/0009765 A1 * | 1/2003 | Linden et al. | 725/95 |
| 2004/0003104 A1 * | 1/2004 | Boskovic et al. | 709/231 |
| 2004/0031054 A1 * | 2/2004 | Dankworth et al. | 725/86 |
| 2004/0100945 A1 | 5/2004 | Morita et al. | |
| 2005/0050424 A1 * | 3/2005 | Matsuura | 714/748 |
| 2006/0059233 A1 * | 3/2006 | Takei et al. | 709/206 |

OTHER PUBLICATIONS

McCanne et al., "Low-Complexity Video Coding for Receiver-Driven Layered Multicast", pp. 983-1001 (Aug. 1997).
McCanne et al., "Vic: A Flexible Framework for Packet Video", pp. 1-12 (Nov. 1995).

(Continued)

*Primary Examiner* — John Follansbee
*Assistant Examiner* — Dhairya A Patel
(74) *Attorney, Agent, or Firm* — Greenblum & Bernstein, P.L.C.

(57) ABSTRACT

A data transmission system includes a sending device and a receiving device. The sending device includes an image receiving unit that indicates the order of reception of the blocks using version numbers, a first database for storing the version numbers of the blocks, a transmitting unit which transmits the blocks to the receiving device using User Datagram Protocol, a determination module which determines whether a block requires resending, an updating unit for updating the version numbers in the first database, and a notification unit for notifying the receiving device of the latest version number of the block at each position using Transmission Control Protocol. The receiving device includes a second database, a receiving unit for receiving blocks using User Datagram Protocol, a display unit for determining the version numbers of the blocks and for displaying the blocks, and a processing unit for sending a request to the sending device.

31 Claims, 4 Drawing Sheets

OTHER PUBLICATIONS

McCanne et al., "Low-Complexity Video Coding for Receiver-Driven Layered Multicast", pp. 983-1001 (Aug. 1997).

McCanne et al., "Vic: A Flexible Framework for Packet Video", pp. 1-12 (Nov. 1995).

* cited by examiner

SYSTEM AND METHOD FOR DATA TRANSMISSION

TECHNICAL FIELD

The invention relates to a data transmission system and method, more particularly to a data transmission system and method for transmitting data over a network.

BACKGROUND ART

Transmission Control Protocol (TCP) and User Datagram Protocol (UDP) are two types of communications protocols at the transmission layer. TCP provides connection-oriented and reliable end-to-end data transmission services. Therefore, a sending end will need to first establish a connection with a receiving end using control information before transmission of data. This is known as a handshaking operation. The transmission of data to the receiving end begins only after the connection is established. Moreover, after completing transmission of data, the sending end will terminate the connection with the receiving end.

On the other hand, UDP provides non-connection-oriented and unreliable data transmission services. Therefore, when a sending end transmits data to a receiving end according to the UDP, complicated procedures like handshaking, recognition, re-transmission in the TCP will not be employed. Thus, in the same network environment, UDP is a form of data transmission that is faster and more efficient than TCP, and the bandwidth used thereby is less than that used by TCP.

However, on the contrary, UDP has a higher data transmission error rate than TCP.

Therefore, a sending end can adopt UDP or TCP to transmit data to the receiving end depending on user requirements. That is, when the accuracy of the data amount is not very important, use of UDP can be considered. On the contrary, if the requirement for the accuracy of the data is stringent, TCP is a better choice. However, if a sending end needs to transmit a large amount of data to a plurality of receiving ends, TCP, which requires more bandwidth, is unable to achieve the function of real-time transmission.

Currently, users in different places often use video conference to conduct meetings. In general, during a video conference, a video camera at each place will capture the image data locally, and the captured image will be transmitted to the other receiving ends at different places over a network. When a sending end transmits a huge amount of video data to a plurality of receiving ends using TCP, the function of real-time imaging cannot be achieved due to insufficient bandwidth. Therefore, generally, in a situation where it is necessary to transmit images or screen frames successively, e.g., in a video conference, E-learning, or remote control, transmission of data between a sending end and at least one receiving end is through UDP. However, the use of UDP to transmit an entire image at one time may also result in serious packet loss problems.

The present solution is to divide an image to be transmitted into a plurality of blocks at the sending end, and transmit the blocks one by one to each receiving end. In addition, since the contents of two consecutive images may not vary significantly, the blocks at the same position in the two consecutive images may be identical. Therefore, when transmitting the second image, it is only necessary to transmit the blocks whose data have changed. There is no need to transmit every block. Thus, the amount of data that needs to be transmitted can be reduced considerably. However, since UDP is an unreliable form of transmission, it cannot be guaranteed that every updated block can smoothly reach each receiving end. Therefore, in case of a transmission error, the images displayed at the receiving ends will continue to show the old blocks, and cannot successfully show the correct blocks.

Thus, while conventional data transmission using TCP can achieve a better accuracy rate, it cannot achieve the object of real-time transmission. However, use of UDP can result in frequent occurrence of transmission errors since UDP is an unreliable form of transmission.

DISCLOSURE OF INVENTION

Therefore, an object of this invention is to provide a data transmission system, which simultaneously has the advantage of fast transmission speed of UDP and the advantage of reliability of TCP.

Therefore, another object of this invention is to provide a data transmission method, which can reduce the amount of data required to be transmitted so as to achieve transmission bandwidth savings.

Accordingly, a data transmission system of this invention includes a sending device and a receiving device. The sending device includes an image receiving unit, a first database, a transmitting unit, a determination module, an updating unit, and a notification unit. The receiving device includes a second database, a data receiving unit, a display unit, and a processing unit.

The image receiving unit divides each image received thereby into a plurality of blocks, and indicates order of reception of blocks received by the image receiving unit using different version numbers.

The first database stores image data and the version number of a latest block at each position in the image received by the image receiving unit.

The transmitting unit is connected electrically to the image receiving unit. The transmitting unit transmits the image data of a block received thereby, a corresponding position of the block in the image, and the version number of the block to the receiving device using User Datagram Protocol.

The determination module is connected electrically to the image receiving unit, and is disposed to receive a block transmitted from the image receiving unit. The determination module issues a notification upon determining that the block needs to be transmitted to the receiving device.

The updating unit is connected electrically to the first database, the determination module, and the transmitting unit, and is disposed to receive the notification transmitted from the determination module. The updating unit updates the version number in the first database according to the notification, and transmits the updated version number, the image data of the block, and the position of the block in the image to the transmitting unit.

The notification unit is connected electrically to the first database. The notification unit refers to the latest version numbers stored in the first database every inspection cycle, and uses Transmission Control Protocol to send a notification to the receiving device so as to notify the receiving device of the latest version number of the block at each position in an image.

The second database stores version numbers of a plurality of blocks.

The data receiving unit utilizes User Datagram Protocol to receive image data of the blocks, the version numbers of the blocks, and the positions of the blocks sent from the sending device.

The display unit is connected electrically to the second database and the data receiving unit. The display unit receives a block transmitted from the data receiving unit, and compares the version number of the block with the version number stored in the second database such that, when the version number of the block is newer, the version number stored in the second database is updated, and the block with the newer version number is displayed on a display screen.

The processing unit is connected electrically to the second database. The processing unit compares the latest version numbers of the blocks stored in the second database with the latest version number of the sent block as notified by the sending device such that, when it is found that the version number recorded in the second database is older than the latest version number as notified by the sending device, the processing unit issues a request to the sending device using Transmission Control Protocol to demand resending of the block.

Accordingly, a data transmission method of this invention includes a data transmitting method and a data receiving method, the data transmitting method being used to send data from a sending end to a receiving end, the data receiving method being used to receive the data transmitted from the sending end, the data transmitting method comprising the following steps:

(A) receiving a first image and dividing the image into N blocks, N being a positive integer greater than or equal to 1, giving each block a corresponding initial version number, and storing image data and the initial version number of each block into a first database;

(B) using User Datagram Protocol to send each block in step (A) to the receiving end;

(C) receiving a next image and dividing the image into N blocks;

(D) determining whether one of the plurality of blocks in step (C) requires resending, the flow proceeding to step (E) if said block does not require resending, the flow otherwise skipping to step (H) to carry out steps (H) and (I) in turn if said block requires resending;

(E) determining whether all of the blocks in an entire image have been processed, the flow proceeding to step (F) if all the blocks have been processed, the flow returning to step (D) to continue processing of other blocks if otherwise;

(F) determining whether K images have been processed, the flow proceeding to step (G) if K images have been processed, the flow returning to step (C) if otherwise, K being a positive integer greater than or equal to 1;

(G) using Transmission Control Protocol to issue a notification to the receiving end to notify the receiving end of a latest version number of each block at each position in an image;

(H) updating the version number of the block stored in the first database which requires resending, and storing the image data of the block requiring resending into the first database; and (I) using User Datagram Protocol to transmit the image data and the version number of the block requiring resending, and the position of the block requiring resending in the image to the receiving end, the flow returning to step (E) thereafter;

the data receiving method comprising the following steps:

(a) using User Datagram Protocol to receive blocks in a first image, version numbers of the blocks, and positions of the blocks in the image from the sending end;

(b) displaying the blocks on a display screen, and storing the version numbers of the blocks and the positions of the blocks in the image in the second database;

(c) using User Datagram Protocol to continue receiving blocks, version number of the blocks, and position of the blocks in an image from the sending end, and comparing the version numbers of the received blocks with the version numbers stored in the second database such that when the version number of a received block is newer, the version number of a corresponding block stored in the second database is updated, and the block with the newer version number is displayed on the display screen;

(d) receiving a notification of the latest version number of the block at each position from the sending end through Transmission Control Protocol; and (e) comparing the version number recorded in the second database with the version number sent from the sending end and, when the version number recorded in the second database is older, requesting the sending end to send the block with the newer version number through Transmission Control Protocol.

BRIEF DESCRIPTION OF DRAWINGS

Other features and advantages of the present invention will become apparent in the following detailed description of the preferred embodiment with reference to the accompanying drawings, of which.

BEST MODE FOR CARRYING OUT THE INVENTION

Figure 1:
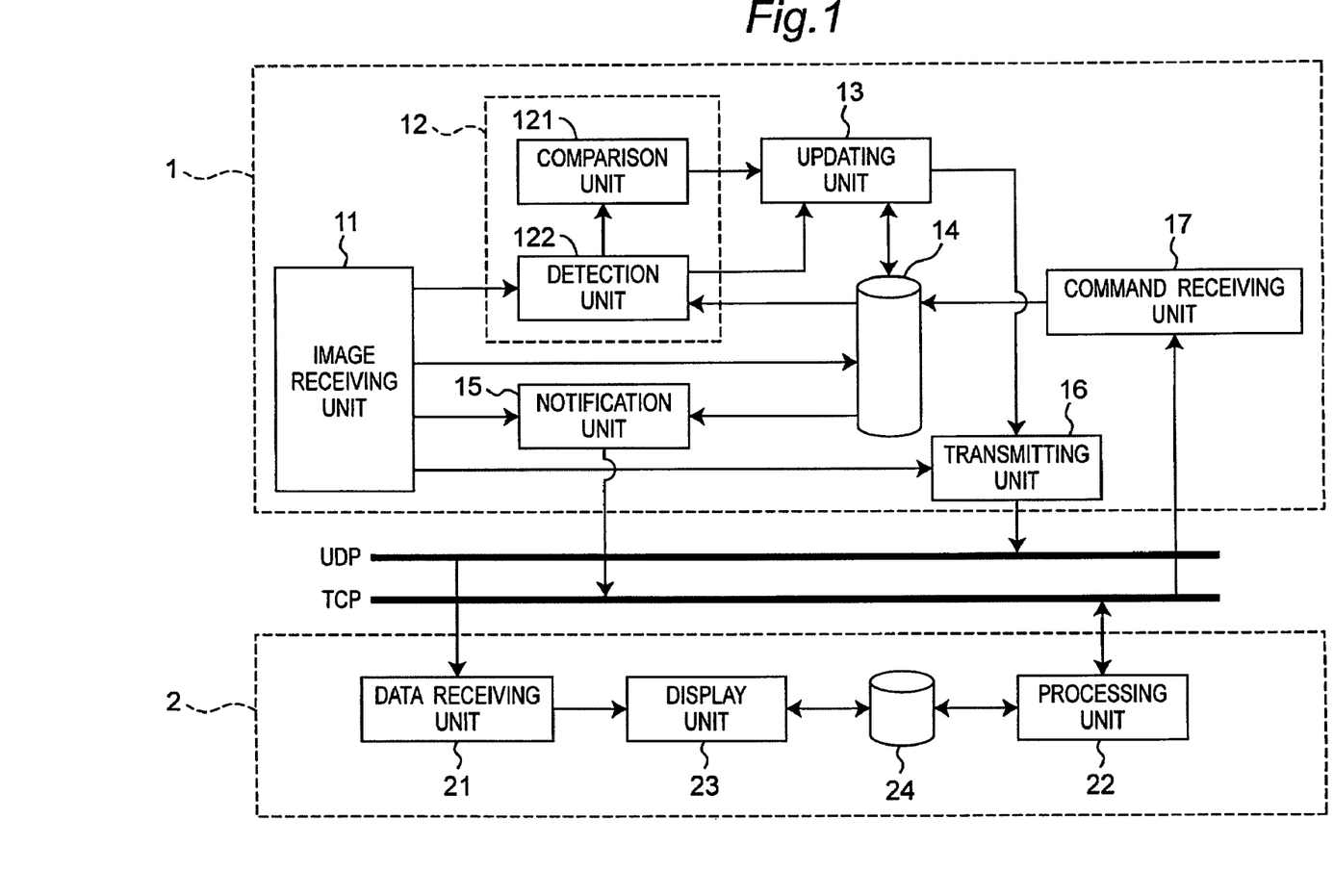
FIG. 1 is a system block diagram of a preferred embodiment of a data transmission system according to the present invention.

Referring to FIG. 1, the preferred embodiment of a data transmission system according to this invention is shown to include a sending device 1 located at a sending end, and a receiving device 2 located at a receiving end.

The sending device 1 includes an image receiving unit 11, a determination module 12, an updating unit 13, a first database 14, a notification unit 15, a transmitting unit 16, and a command receiving unit 17.

The receiving device 2 includes a data receiving unit 21, a processing unit 22, a display unit 23, and a second database 24.

The image receiving unit 11 of the sending device 1 can continuously receive images from devices, such as a video camera or a still camera. In addition, the image receiving unit 11 may also continuously capture screen frames. The image receiving unit 11 divides each image or frame received or captured thereby into a plurality of blocks. Each block is given a version number and a flag. The version number and the flag are stored in the first database 14.

The image receiving unit 11 indicates the order of the blocks of two consecutive images received thereby using different version numbers, and gives an independent version number system to blocks located at different positions. For example, for blocks at a top leftmost corner of the image, a larger version number is given to a block received later according to the order of the time of reception. That is, the version number of the block at the top leftmost corner of the image which is received at time t1 is set as 1; the version number of the block at the top leftmost corner which is received at time (t1+Δt) is set as 2; and the version number of the block at the top leftmost corner which is received at time (t1+2×Δt) is set as 3. Besides, in order to avoid excessively fast increment of the version numbers of the blocks, the version number of a block is increased only after it has been confirmed that the block needs to be transmitted to the receiving device 2. If the block does not need to be transmitted, the version number does not need to be increased.

The flags can be set respectively to be in a first state or a second state. When a flag is in the first state, this indicates that the block corresponding to the flag needs to be re-transmitted to the receiving end. When the block corresponding to the flag has been resent or the block corresponding to the flag does not need to be resent to the receiving end, the flag will be set to be in the second state.

In this embodiment, the period during which the image receiving unit 11 receives K images is set as an inspection cycle, K being a positive integer greater than or equal to 1. K is generally set as 5, but can also be increased or decreased depending on the system specification. Every time the image receiving unit 11 receives K images, it will notify the notification unit 15 that an inspection cycle has been reached.

The first database 14 stores image data of the latest block at each position in an image, the version number of the latest block at each position, and the corresponding flag state of each latest block.

The determination module 12 includes a comparison unit 121 and a detection unit 122. The determination module 12 receives a block transmitted from the image receiving unit 11, and sends a notification upon determining that the block needs to be transmitted to the receiving end.

The detection unit 122 of the determination module 12 is connected electrically to the image receiving unit 11, the updating unit 13, and the first database 14, and receives a block transmitted from the image receiving unit 11. The detection unit 122 detects a flag stored in the first database 14 and corresponding to the block, and notifies the updating unit 13 of the block to which the flag corresponds and the current version number of the block upon finding that the flag is in the first state.

The comparison unit 121 of the determination module 12 is connected electrically to the detection unit 122 and the updating unit 13. The comparison unit 121 receives the block which has been determined by the detection unit 122, and compares the received block with a block at the same position in the immediately preceding image to determine whether the image data of the corresponding block in the immediately preceding image is identical thereto. If the image data of the received block have changed, the updating unit 13 will be notified of the block and the current version number of the block.

The updating unit 13 is connected electrically to the transmitting unit 16 and the first database 14, and receives the notification sent from the comparison unit 121 or the detection unit 122. The updating unit 13 adds 1 to the version number of the updated block or the block whose flag is in the first state according to the notification, and sends the new version number, the image data of the block, information (e.g., position) of the block in the image, etc., to the first database 14 for storage and to the transmitting unit 16. In addition, the updating unit 13 may also switch the flag of the block transmitted to the receiving end as stored in the first database to the second state.

The transmitting unit 16 can transmit the block and relevant information, such as information of the corresponding position of the block in the image, the version number of the block, image data, etc., as sent from the updating unit 13 or the image receiving unit 11 to the data receiving unit 21 of the receiving device 2 using UDP.

The notification unit 15 is connected electrically to the image receiving unit 11 and the first database 14. The image receiving unit 11 will notify the notification unit 15 every inspection cycle. The notification unit 15 will then start referring to the latest version numbers stored in the first database 14, and issues a notification to the processing unit 22 of the receiving device 2 using TCP so as to notify the processing unit 22 of the latest version number of the block currently located at each position of an image.

The command receiving unit 17 is connected electrically to the first database 14, and receives commands sent from the processing unit 22 of the receiving device 2 using TCP. The command receiving unit 17 controls the states of the flags stored in the first database 14 according to the commands. That is, when a command includes a block that the receiving end wants the sending end to resend, the command receiving unit 17 will set the flag corresponding to the block to a first state.

The second database 24 of the receiving device 2 stores the version numbers of the blocks.

The data receiving unit 21 is connected electrically to the display unit 23, and receives blocks and relevant information sent from the transmitting unit 16 at the sending end using UDP. The data receiving unit 21 transmits the image data and the version numbers of the blocks, as well as the positions of the blocks in the image, to the display unit 23.

The display unit 23 is connected electrically to the second database 24, and receives blocks transmitted from the data receiving unit 21. The display unit 23 compares the version number of a received block with the version number of a corresponding block stored in the second database 24. When the version number of the received block is newer than that of the block stored in the second database 24, the version number of the block stored in the second database 24 is updated, and the block with the newer version number is displayed on the display screen.

The processing unit 22 is connected electrically to the second database 24, and compares the latest version numbers of the blocks stored in the second database 24 with the latest version numbers of the blocks that the sending end has sent and as notified by the notification unit 15. If the processing unit 22 finds the version numbers recorded in the second database 24 to be older than the latest version numbers as notified by the notification unit 15, this indicates loss or damage of the blocks during the transmission process. The processing unit 22 will then send a notification to the command receiving unit 17 of the sending device 1 using TCP so as to issue a request for resending lost or damaged blocks. The resend request will include a message for the block at each position as to whether resending is required.

Figure 2:
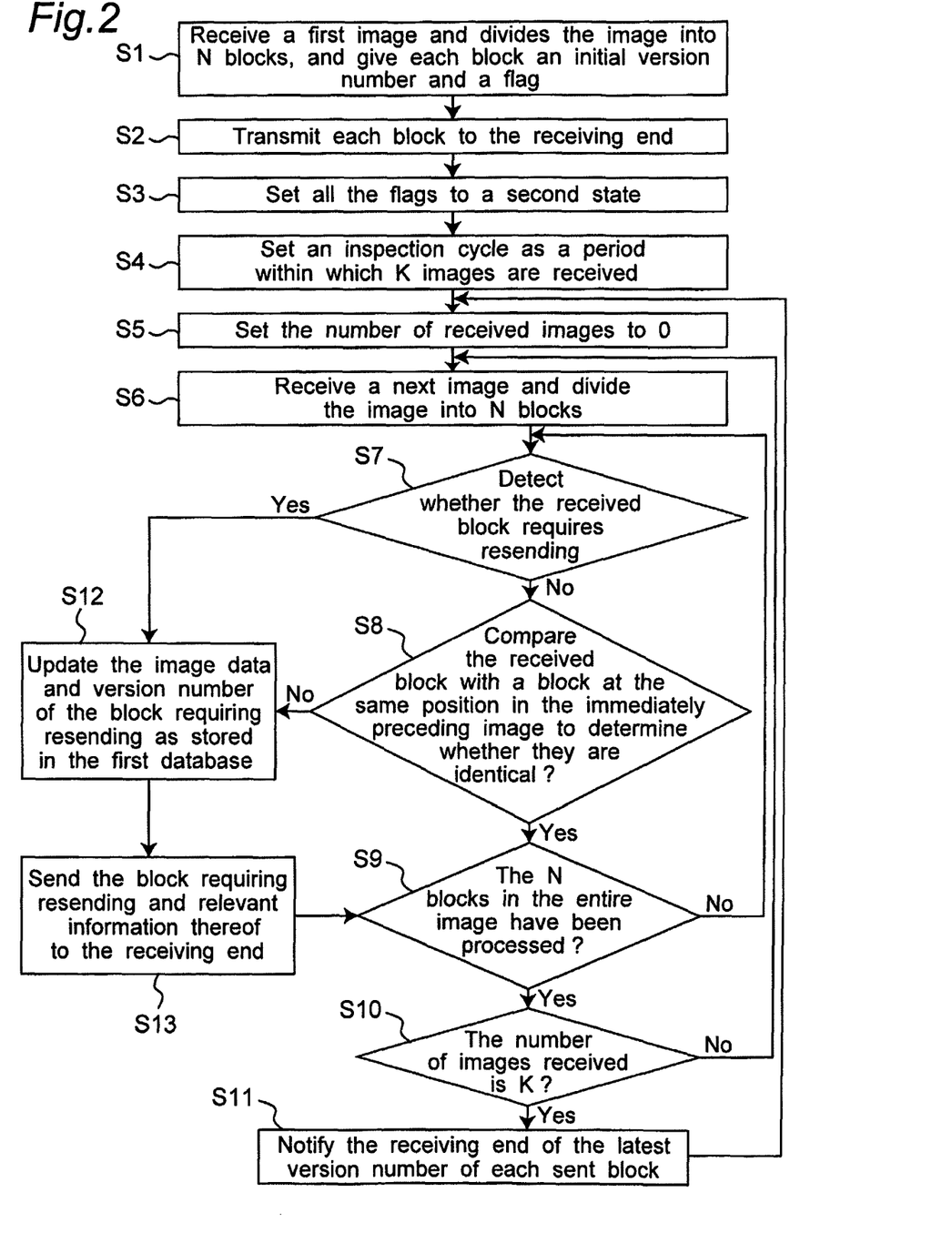
FIG. 2 is a flowchart of the preferred embodiment, illustrating the process flow of sending a block from a sending end to a receiving end.

As shown in FIGS. 1 and 2, the method adopted by the sending device 1 of the data transmission system for image transmission to the receiving device 2 in this embodiment is shown to include the following steps:

In step S1, the image receiving unit 11 receives a first image, and divides the first image into N blocks (N being a positive integer greater than 1 or equal to 1). Each block is given a corresponding initial version number and a flag. The image data, the initial version number and the flag of each block are stored in the first database 14.

In step S2, the image receiving unit 11 commands the transmitting unit 16 to send each block in step S1 to the data receiving unit 21 at the receiving end using UDP.

In step S3, the image receiving unit 11 sets all the flags stored in the first database 14 to the second state.

In step S4, the image receiving unit 11 sets an inspection cycle. The inspection cycle is a period of time within which the image receiving unit 11 receives or captures K images.

In step S5, the image receiving unit 11 sets the number of the received images to 0.

In step S6, the image receiving unit 11 receives a next image, and divides the image into N blocks. The blocks are transmitted to the detection unit 122 one by one.

In step S7, the detection unit 122 determines whether the block transmitted from the image receiving unit 11 requires resending according to the state of the flag of the corresponding block stored in the first database 14. If it is determined that the block does not require resending, the flow proceeds to step S8. Otherwise, the flow skips to step S12.

In step S8, the comparison unit 121 compares the block that has been determined by the detection unit 122 with a block at the same position in the immediately preceding image to determine whether they are identical. In the affirmative, the flow proceeds to step S9. Otherwise, the flow skips to step S12.

In step S9, it is determined whether the detection unit 12 has finished processing all the blocks in an entire image. In the affirmative, the flow proceeds to step S10. Otherwise, the flow returns to step S7 to continue with the processing of other blocks.

In step S10, it is determined whether the number of images received by the image receiving unit 11 is K. In the affirmative, this indicates that an inspection cycle is reached, and the flow proceeds to step S11. Otherwise, the flow returns to step S6.

In step S11, the notification unit 15 uses TCP to issue a notification to the processing unit 22 of the receiving device 2 so as to notify the processing unit 22 of the latest version number of each block sent from the sending end, and the latest version number of the block at each position in an image.

In step S12, the updating unit 13 adds 1 to the version number of the updated block or a block whose flag is in the first state, and transmits the updated version number and the image data of the block, information of the position of the block in the image, etc., to the first database 14 for storage and to the transmitting unit 16.

In step S13, the transmitting unit 16 uses UDP to transmit the block that requires resending and the relevant information thereof to the data receiving unit 21 of the receiving device 2. Thereafter, the flow returns to step S9.

Figure 3:
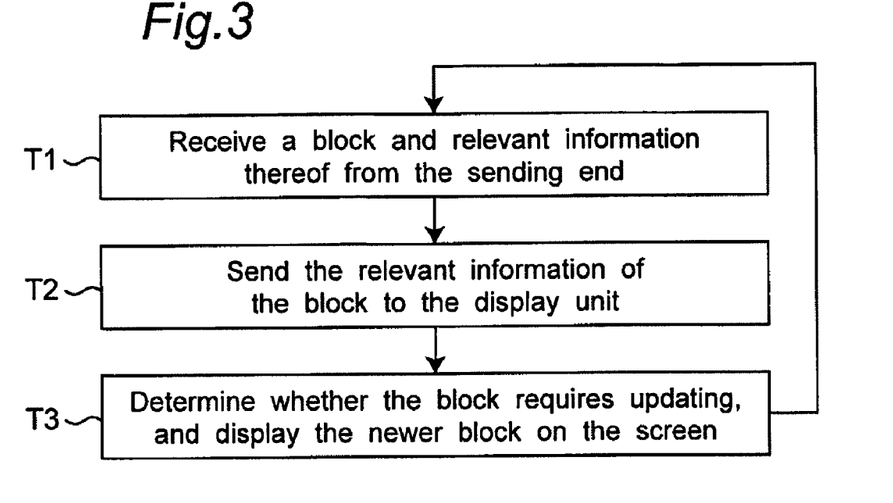
FIG. 3 is a flowchart of the preferred embodiment, illustrating the process flow of receiving the block at the receiving end.

Referring to FIGS. 1 and 3, the method adopted by the receiving device 2 of the data transmission system for receiving the blocks transmitted from the sending device 1 in this embodiment includes the following steps:

In step T1, the data receiving unit 21 uses UDP to receive relevant information, such as image data of the block, the version number of the block, information of the corresponding position of the block in the image, etc., as sent from the transmitting unit 16 of the sending device 1.

In step T2, the data receiving unit 21 transmits relevant information, such as image data of the block, the version number of the block, information of the corresponding position of the block in the image, etc., as received in step T1 to the display unit 23.

In step T3, according to the version number of the block transmitted from the data receiving unit 21, the display unit 23 determines whether the version number of the block is the earliest version number of blocks at the same position received in step T1. In the affirmative, the block is displayed directly on the display screen, and the version number of the block is stored in the second database 24. Otherwise, the version number of the block is compared with the version number of the corresponding block stored in the second database 24. If the version number of the received block is newer than that of the block stored in the second database 24, the version number of the block stored in the second database 24 is updated, and the block with the newer version number is displayed on the display screen. The flow skips back to step T1 after completing step T3.

Figure 4:
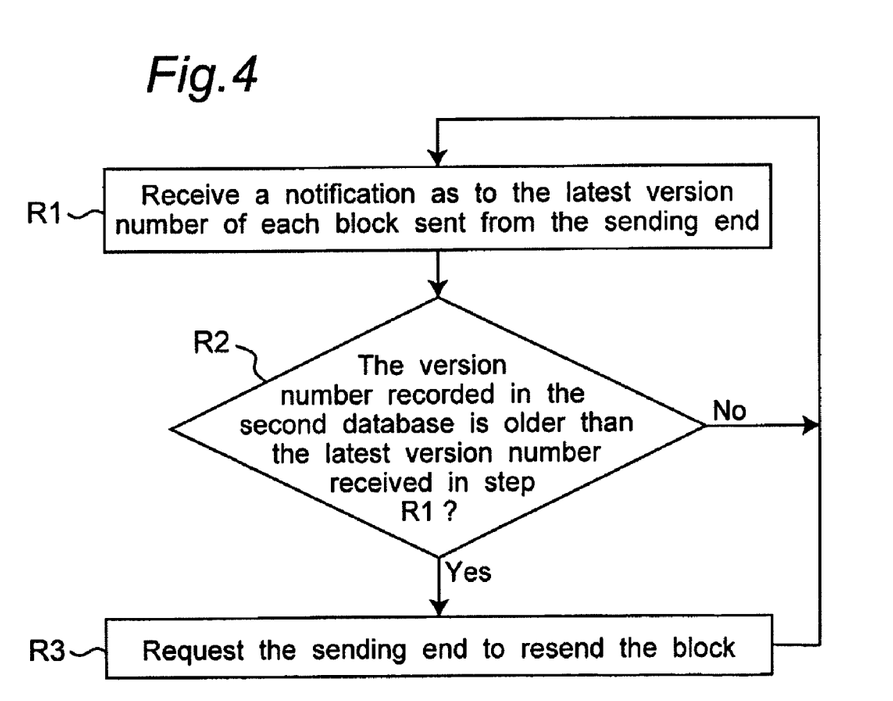
FIG. 4 is a flowchart of the preferred embodiment, illustrating the process flow of sending a notification at the receiving end for requesting retransmission of a block.

Referring to FIGS. 1 and 4, the data transmission method employed by the receiving device 2 of the data transmission system for receiving a notification sent from the sending device 1 in this embodiment includes the following steps:

In step R1, the processing unit 22 of the receiving device 2 uses TCP to receive a notification as to the latest version number of the block at each position from the notification unit 15 of the sending device 1.

In step R2, the processing unit 22 determines whether the version number recorded in the second database 24 is older than the latest version number received in step R1 by comparison. In the affirmative, the flow proceeds to step R3. Otherwise, the flow returns to step R1.

In step R3, the processing unit 22 uses TCP to request the command receiving unit 17 of the sending device 1 to send the block whose version number as recorded in the second database 24 is older than the latest version number as notified by the notification unit 15.

Figure 5:
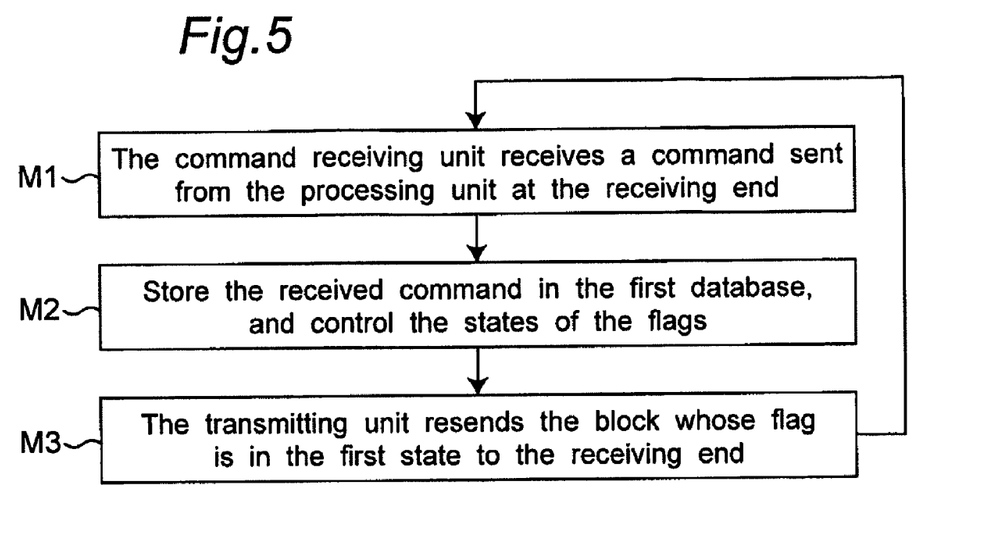
FIG. 5 is a flowchart of the preferred embodiment, illustrating the process flow of receiving the notification for requesting retransmission of the block at the sending end.

As shown in FIGS. 1 and 5, the data transmission method used by the sending device 1 of the data transmission system for receiving the notification sent from the receiving device 2 in this embodiment includes the following steps:

In step M1, the command receiving unit 17 uses TCP to receive a command sent from the processing unit 22 of the receiving device 2.

In step M2, the command receiving unit 17 controls the states of the flags stored in the first database 14 according to the received command to place the flag of the block requiring resending in the first state.

In step M3, according to the states of the flags in the first database 14, the detection unit 122 commands the transmitting unit 16 through the updating unit 13 to resend the block whose flag is in the first state to the receiving device 2.

It is noted that although this embodiment is exemplified to include only one receiving device 2, the present invention may include a plurality of the receiving devices 2 in actual practice. The components of each receiving device 2 and the operations of the components are the same as those described hereinabove, and each receiving device 2 can perform the above-described data exchange process with the sending device 1.

In summary, the present invention utilizes UDP to transmit image blocks of a relatively large amount of data, and identifies new and old relationships among the blocks by assigning a version number to each block. The present invention further utilizes the reliable TCP to transmit messages and commands as regards whether a block has correctly arrived or requires resending. Thus, the present invention has the advantage of fast transmission speed attributable to UDP, as well as the advantage of reliability attributable to TCP, thereby achieving the objects of the present invention. In addition, the present invention checks whether a block has correctly reached the receiving end every inspection cycle, thereby avoiding the problem of taking up too much transmission bandwidth for repetitive checking and verification operations associated with the use of TCP. Furthermore, the present invention also assigns a corresponding flag to each block to indicate whether a block requires resending so as to facilitate the execution of verification and marking operations.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to a system and method for data transmission.

The invention claimed is:

1. A sending device for transmitting data to a receiving device, said sending device comprising:
   an image receiver that divides each received image into a plurality of blocks, that indicates an order of reception of blocks received by said image receiver using different version numbers, and that gives an independent version number to blocks located at different positions;
   a first database configured to store latest image data and a latest version number of a block at each position in the image received by said image receiver;
   a transmitter, electrically connected to said image receiver, said transmitter transmitting image data of a block received by the transmitter, a corresponding position of the block in the image, and the version number of the block to the receiving device using User Datagram Protocol;
   a determiner, electrically connected to said image receiver and configured to receive a block from said image receiver, said determiner issuing a notification upon determining that the received block needs to be transmitted to the receiving device;
   an updater, electrically connected to said first database, to said determiner, and to said transmitter, and configured to receive the notification from said determiner, said updater incrementing the latest version number of the block stored in said first database, independently of the latest version number of the other blocks located at different positions, only when the notification is received from the determiner, and providing the incremented version number of the block, the image data of the block, and the position of the block in the image to said transmitter; and
   a notifier, electrically connected to said first database, said notifier referring to the latest version numbers stored in said first database every inspection cycle, and sending, using Transmission Control Protocol, to the receiving device, the latest version number of the block at each position in an image, without accompanying image data in the block.

2. The sending device as claimed in claim 1, wherein said determiner includes a comparator electrically connected to said updater, said comparator comparing image data of the blocks which are at a same position in two consecutive images received by the image receiver, and
   wherein, when the image data of a block have changed, said comparator sends the notification, including the block and a current version number of the block, to said updater.

3. The sending device as claimed in claim 1, wherein said image receiver further assigns a flag to each block, each flag being set to a first state or a second state, such that the flag is in the first state, when the block corresponding to the flag needs to be resent to the receiving device, and the flag is set to the second state when the block corresponding to the flag has been resent or the block corresponding to the flag does not need to be resent to the receiving device, a latest state of the flag of a block at each position in the image being stored in said first database.

4. The sending device as claimed in claim 3, wherein said updater is configured to switch the flag of the block that has been transmitted to the receiving device and that is stored in said first database to the second state.

5. The sending device as claimed in claim 3, further comprising a command receiver, electrically connected to said first database, said command receiver utilizing Transmission Control Protocol to receive, from the receiving device, a command to resend a block to the receiving device, and controlling the states of the flags stored in said first database according to the command such that, when the command includes a block that the receiving device wants said sending device to resend the image data thereof, said command receiver sets the flag corresponding to the block to the first state.

6. The sending device as claimed in claim 5, wherein said determiner includes a detector, electrically connected to said updater and said first database, said detector detecting the states of the flags stored in said first database, and, upon detecting one of the flags to be in the first state, notifying said updater of the block to which said one of the flags corresponds and a current version number of the block.

7. The sending device as claimed in claim 1, wherein said image receiver continuously receives images from a video camera.

8. The sending device as claimed in claim 1, wherein said image receiver continuously captures screen frames.

9. The sending device as claimed in claim 1, wherein said image receiver notifies said notifier that an inspection cycle has been reached every time K images are received, K being an integer greater than or equal to 1.

10. A data transmission system including a sending device and a receiving device, said sending device being capable of transmitting data to said receiving device, said receiving device being capable of receiving the data sent from said sending device,
    said sending device comprising:
    an image receiver that divides each received image into a plurality of blocks, and that indicates an order of reception of blocks received by said image receiver using different version numbers, and gives an independent version number to blocks located at different positions;
    a first database configured to store latest image data and a latest version number of a block at each position in the image received by said image receiver;
    a transmitter, electrically connected to said image receiver, said transmitter transmitting image data of a block received by the transmitter, a corresponding position of the block in the image, and the version number of the block to said receiving device using User Datagram Protocol;
    a determiner, electrically connected to said image receiver and configured to receive a block from said image receiver, said determiner issuing a notification upon determining that the received block needs to be transmitted to said receiving device;
    an updater, electrically connected to said first database, to said determiner, and to said transmitter, and configured to receive the notification from said determiner, said updater incrementing the latest version number of the block stored in said first database independently of the latest version number of the other blocks located at different positions, only when the notification is received from the determiner, and providing the incremented version number of the block, the image data of the block, and the position of the block in the image to said transmitter; and a notifier, electrically connected to said first database, said notifier referring to the latest version numbers stored in said first database every inspection cycle, and sending, to said receiving device, the latest version number of the block at each position in an image, without accompanying image data in the block, using Transmission Control Protocol;

said receiving device comprising:

a second database configured to store version numbers of a plurality of blocks;

a data receiver that utilizes User Datagram Protocol to receive the image data of the blocks, the version numbers of the blocks, and the positions of the blocks in an image sent from the transmitter of said sending device;

a display, electrically connected to said second database and said data receiver, said display receiving a block from said data receiver and comparing the version number of the received block with the version number of the corresponding block stored in said second database such that, when the version number of the received block is newer than the version number stored in said second database, the version number stored in said second database is updated, and the block with the updated version number is displayed on a display screen; and a processor, electrically connected to said second database, said processor receiving the latest version numbers of blocks, without accompanying image data of the blocks, from the notifier of the sending device using Transmission Control Protocol, and comparing the version numbers of the blocks stored in said second database with the latest version numbers of the blocks received from the notifier of said sending device such that, when the version number of a block stored in said second database is older than the latest version number of the corresponding block notified by said sending device, said processor issues a request to said sending device using Transmission Control Protocol to demand resending of the block, the request including a message for the block at each position as to whether resending is required.

11. The data transmission system as claimed in claim 10, wherein said determiner includes a comparator, electrically connected to said updater, said comparator comparing image data of blocks which are at a same position in two consecutive images received by the image receiver, and wherein, when the image data of a block have changed, said comparator sends the notification, including the block and a current version number of the block, to said updater.

12. The data transmission system as claimed in claim 10, wherein said image receiver assigns a flag to each block, each flag being set to a first state or a second state such that the flag is in the first state, when the block corresponding to the flag needs to be resent to said receiving device, and the flag is set to the second state when the block corresponding to the flag has been resent or the block corresponding to the flag does not need to be resent to said receiving device, a latest state of the flag of a block at each position in the image being stored in said first database.

13. The data transmission system as claimed in claim 12, wherein said updater configured to switch the flag of the block that has been transmitted to said receiving device and that is stored in said first database to the second state.

14. The data transmission system as claimed in claim 12, wherein said sending device further comprises a command receiver, electrically connected to said first database, the command receiver utilizing Transmission Control Protocol to receive, from said receiving device, a command to resend a block to said receiving device, and controlling the states of the flags stored in said first database according to the command such that when the command includes a block that said receiving device wants said sending device to resend the image data thereof, said command receiver sets the flag corresponding to the block to the first state.

15. The data transmission system as claimed in claim 14, wherein said determiner includes a detector, electrically connected to said updater and to said first database, said detector detecting the states of the flags stored in said first database and, upon detecting one of the flags being in the first state, notifying said updater of the block to which said one of the flags corresponds and a current version number of the block.

16. The data transmission system as claimed in claim 10, wherein said image receiver continuously receives images from a video camera.

17. The data transmission system as claimed in claim 10, wherein said image receiver continuously captures screen frames.

18. The data transmission system as claimed in claim 10, wherein said image receiver notifies said notifier that an inspection cycle has been reached every time K images are received, K being an integer greater than or equal to 1.

19. A data transmitting method for transmitting data from a sending device to a receiving device, the data transmitting method comprising:

(A) receiving a first image and dividing the image into N blocks, N being a positive integer greater than or equal to 1, giving the blocks located at different positions corresponding initial version numbers, respectively, and storing image data and the initial version number of each block into a first database;

(B) using User Datagram Protocol to send image data of each block in (A) to the receiving device;

(C) receiving a next image and dividing the image into N blocks;

(D) determining whether one of the N blocks in (C) requires resending, performing (E) if the block does not require resending, otherwise skipping to (H) to perform (H) and (I) in turn if the block requires resending;

(E) determining whether all of the blocks in the image in (C) have been processed, performing (F) if all of the blocks have been processed, and returning to (D) to continue processing of other blocks if not all of the blocks have been processed;

(F) determining whether K images have been processed, performing (G) if K images have been processed, and returning to (C) if K images have not been processed, K being a positive integer greater than or equal to 1;

(G) transmitting, using Transmission Control Protocol, to the receiving device, of a latest version number of each block at each position in an image, without accompanying image data in the block;

(H) incrementing the version number of the block stored in the first database which requires resending independent of the version number of the other blocks located at different positions, and storing the image data of the block requiring resending in the first database; and (I) using User Datagram Protocol to transmit the image data and the version number of the block requiring resending, and the position of the block requiring resending in the image to the receiving device, and returning to (E) after the transmitting.

20. The data transmitting method as claimed in claim 19, wherein, in (A), each block is further given a corresponding flag, each flag being set to be in a first state or a second state, the flag indicating that a block corresponding to the flag requires resending to the receiving device when the flag is in the first state, the flag being set to the second state when the block corresponding to the flag has been resent or does not require resending to the receiving device, a latest state of the flag of the block at each position in the image being stored in the first database.

21. The data transmitting method as claimed in claim 20, further comprising: setting each flag corresponding to each block in the first database to the second state between (A) and (C).

22. The data transmitting method as claimed in claim 21, wherein, in (D), resending of the block is determined according to a state of the corresponding flag in the first database.

23. The data transmitting method as claimed in claim 22, further comprising comparing image data of a received block with image data of a block at the same position in an immediately preceding image between (D) and (E), performing (E) if the image data are the same, and performing (H) to carry out (H) and (I) in turn if the image data are not the same.

24. The data transmitting method as claimed in claim 22, further comprising:
receiving a command sent from the receiving device using Transmission Control Protocol, and
controlling states of the flags stored in the first database according to the received command so as to place the flag of the block requiring resending in the first state.

25. A data receiving method for receiving data transmitted from a sending device, the data receiving method comprising:
(a) using User Datagram Protocol to receive image data of a block, a version number of the block, and a position of the block in an image from a sending device;
(b) determining whether the received version number of the block is an earliest version number of blocks at a same position received in (a), and displaying the block on a display screen, and storing the version number of the block in a second database, when the received version number of the block is the earliest version number,
when the received version number of the block is not the earliest version number, comparing the received version number of the block with a version number of a corresponding block stored in the second database, updating the version number of the corresponding block stored in the second database when the received version number of the block is newer than the version number of the corresponding block stored in the second database, and displaying the block having the updated version number on the display screen;
(c) receiving a notification of a latest version number of a block at each position from the sending device through Transmission Control Protocol, without accompanying image data of the block; and
(d) comparing the version number of a block at each corresponding position stored in the second database with the latest version number sent from the sending device through Transmission Control Protocol, and, when the version number stored in the second database is older than the latest version number, sending a request, to the sending device, through Transmission Control Protocol, to send, to the receiving device, the block with the latest version number, the request including a message for the block at each position as to whether resending is required.

26. A data transmission method, which includes a data transmitting method and a data receiving method, the data transmitting method being used to send data from a sending device to a receiving device, the data receiving method being used to receive, by the receiving device, the data transmitted from the sending device,
the data transmitting method comprising:
(A) receiving a first image and dividing the image into N blocks, N being a positive integer greater than or equal to 1, giving each block a corresponding initial version number, giving, respectively, mutually independent version numbers to blocks located at different positions, and storing image data and the initial version number of each block into a first database;
(B) using User Datagram Protocol to send image data of each block in (A) to the receiving device;
(C) receiving a next image and dividing the image into N blocks;
(D) determining whether one of the N blocks in (C) requires resending, performing (E) if the block does not require resending, otherwise skipping to (H) to perform (H) and (I) in turn if the block requires resending;
(E) determining whether all of the blocks in the image in (C) have been processed, performing (F) if all the blocks have been processed, and returning to (D) to continue processing of other blocks if not all of the blocks have been processed;
(F) determining whether K images have been processed, performing (G) if K images have been processed, and returning to (C) if K images have not been processed, K being a positive integer greater than or equal to 1;
(G) transmitting, using Transmission Control Protocol, to the receiving device, a latest version number of each block at each position in an image, without accompanying image data in the block;
(H) incrementing the version number of the block stored in the first database which requires resending independent of the version number of the other blocks located at different positions, and storing the image data of the block requiring resending in the first database; and
(I) using User Datagram Protocol to transmit the image data and the version number of the block requiring resending, and the position of the block requiring resending in the image to the receiving device, and returning to (E) after the transmitting;
the data receiving method comprising:
(a) using User Datagram Protocol to receive image data of a block, a version number of the block, and a position of the block in an image from the sending device;
(b) determining whether the received version number of the block is an earliest version number of blocks at a same position received in (a), and displaying the block on a display screen, and storing the version number of the block in a second database, when the received version number of the block is the earliest version number,
when the received version number of the block is not the earliest version number, comparing the received version number of the block with a version number of a corresponding block stored in the second database, updating the version number of the corresponding block stored in the second database when the received version number of the block is newer than the version number of the corresponding block stored in the second database, and displaying the block having the updated version number on the display screen;

(c) receiving a notification of a latest version number of a block at each position from the sending device through Transmission Control Protocol, without accompanying image data of the block; and (d) comparing the version number of a block at each corresponding position stored in the second database with the latest version number sent from the sending device through Transmission Control Protocol, and, when the version number stored in the second database is older than the latest version number, sending a request, to the sending device, through Transmission Control Protocol, to send, to the receiving device, the block with the latest version number, the request including a message for the block at each position as to whether resending is required.

27. The data transmission method as claimed in claim 26, wherein, in (A), each block is further given a corresponding flag, each flag being set to be in a first state or a second state, the flag indicating that a block corresponding to the flag requires resending to the receiving device when the flag is in the first state, the flag being set to the second state when the block corresponding to the flag has been resent or does not require resending to the receiving device, a latest state of the flag of the block at each position in the image being stored in the first database.

28. The data transmission method as claimed in claim 27, wherein the data transmitting method further includes: setting each flag corresponding to each block in the first database to the second state between (A) and (C).

29. The data transmission method as claimed in claim 28, wherein, in (D), resending of the block is determined according to a state of the corresponding flag in the first database.

30. The data transmission method as claimed in claim 29, wherein the data transmitting method further comprises: comparing image data of a received block with image data of a block at the same position in an immediately preceding image between (D) and (E), performing (E) if the image data are the same, and performing (H) to carry out (H) and (I) in turn if the image data are not the same.

31. The data transmission method as claimed in claim 29, wherein the data transmitting method further comprises:
receiving, by the sending device, a command sent from the receiving device using Transmission Control Protocol, and
controlling, by the sending device, states of the flags stored in the first database according to the received command so as to place the flag of the block requiring resending in the first state.

\* \* \* \* \*